(12) United States Patent
Byun (10) Patent No.: US 9,166,256 B2
(45) Date of Patent: Oct. 20, 2015

(54) RECHARGEABLE BATTERY

(71) Applicant: SAMSUNG SDI CO., LTD., Yongin-si, Gyeonggi-do (KR)

(72) Inventor: Bo-Hyun Byun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 226 days.

(21) Appl. No.: 13/911,112

(22) Filed: Jun. 6, 2013

(65) Prior Publication Data

US 2014/0199563 A1    Jul. 17, 2014

(30) Foreign Application Priority Data

Jan. 17, 2013    (KR) .......................... 10-2013-0005562

(51) Int. Cl.
*H01M 10/42* (2006.01)
*H01M 2/02* (2006.01)

(52) U.S. Cl.
CPC ........ *H01M 10/4257* (2013.01); *H01M 2/0217* (2013.01); *H01M 2200/00* (2013.01)

(58) Field of Classification Search
CPC .......... H01M 10/4257; H01M 2/0217; H01M 2/0267; H01M 2/04; H01M 2/34
USPC ............................................................. 429/7
See application file for complete search history.

(56) References Cited

U.S. PATENT DOCUMENTS

| | | | |
|---|---|---|---|
| 2010/0075205 A1 | 3/2010 | Kwag et al. | |
| 2010/0136408 A1* | 6/2010 | Koh et al. | 429/122 |
| 2010/0316891 A1* | 12/2010 | Jang et al. | 429/7 |
| 2011/0123837 A1* | 5/2011 | Baek et al. | 429/7 |
| 2012/0070698 A1* | 3/2012 | Baek | 429/7 |
| 2012/0121942 A1* | 5/2012 | Kim | 429/7 |
| 2012/0129012 A1* | 5/2012 | Baek | 429/7 |
| 2013/0095364 A1* | 4/2013 | Yong et al. | 429/120 |
| 2013/0330574 A1* | 12/2013 | Byun | 429/7 |

FOREIGN PATENT DOCUMENTS

| | | |
|---|---|---|
| KR | 10-2010-0033913 A | 3/2010 |
| KR | 10-2011-0057502 A | 6/2011 |

* cited by examiner

*Primary Examiner* — Stewart Fraser
(74) *Attorney, Agent, or Firm* — Lee & Morse, P.C.

(57) ABSTRACT

A rechargeable battery including a case in which an electrode assembly is accommodated; a cap plate coupled with the case; a protection circuit board coupled with the cap plate, the protection circuit board being electrically connected with a first electrode of the electrode assembly; and a protection element coupled with the cap plate, the protection element electrically coupling a second electrode of the electrode assembly with the protection circuit board.

10 Claims, 7 Drawing Sheets

RECHARGEABLE BATTERY

CROSS-REFERENCE TO RELATED APPLICATION

Korean Patent Application No. 10-2013-0005562 filed on Jan. 17, 2013, in the Korean Intellectual Property Office, and entitled: "RECHARGEABLE BATTERY," is incorporated by reference herein in its entirety.

BACKGROUND

1. Field

Embodiments relate to a rechargeable battery.

2. Description of the Related Art

A rechargeable battery may be repeatedly charged and discharged, unlike a primary battery that is incapable of being recharged. A rechargeable battery of a low capacity may be used for a small portable electronic device, e.g., a mobile phone, a laptop computer, and a camcorder. A large capacity battery may be used as a power source for, e.g., driving a motor of a hybrid vehicle, etc.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery.

The embodiments may be realized by providing a rechargeable battery including a case in which an electrode assembly is accommodated; a cap plate coupled with the case; a protection circuit board coupled with the cap plate, the protection circuit board being electrically connected with a first electrode of the electrode assembly; and a protection element coupled with the cap plate, the protection element electrically coupling a second electrode of the electrode assembly with the protection circuit board.

The cap plate may be electrically connected with the second electrode of the electrode assembly, and the protection element may be electrically connected with the second electrode of the electrode assembly through the cap plate.

The protection element may include a first protrusion coupled with the protection circuit board, and a second protrusion coupled with the cap plate.

The second protrusion may be coupled with the cap plate by welding.

The protection element may be coupled with the cap plate by a coupling member inserted into a through-hole in the second protrusion of the protection element.

The first protrusion may be on a plane different from a plane of the second protrusion.

The rechargeable battery may further include a support member between the protection circuit board and the cap plate.

The support member may include a support member main body coupled with the protection circuit board, and a support member coupling portion coupled with the cap plate.

The support member may be fixed to the cap plate by a coupling member inserted into a through-hole of the support member protrusion of the support member.

The support member may be formed of an insulation material.

The support member may have a stepped structure.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
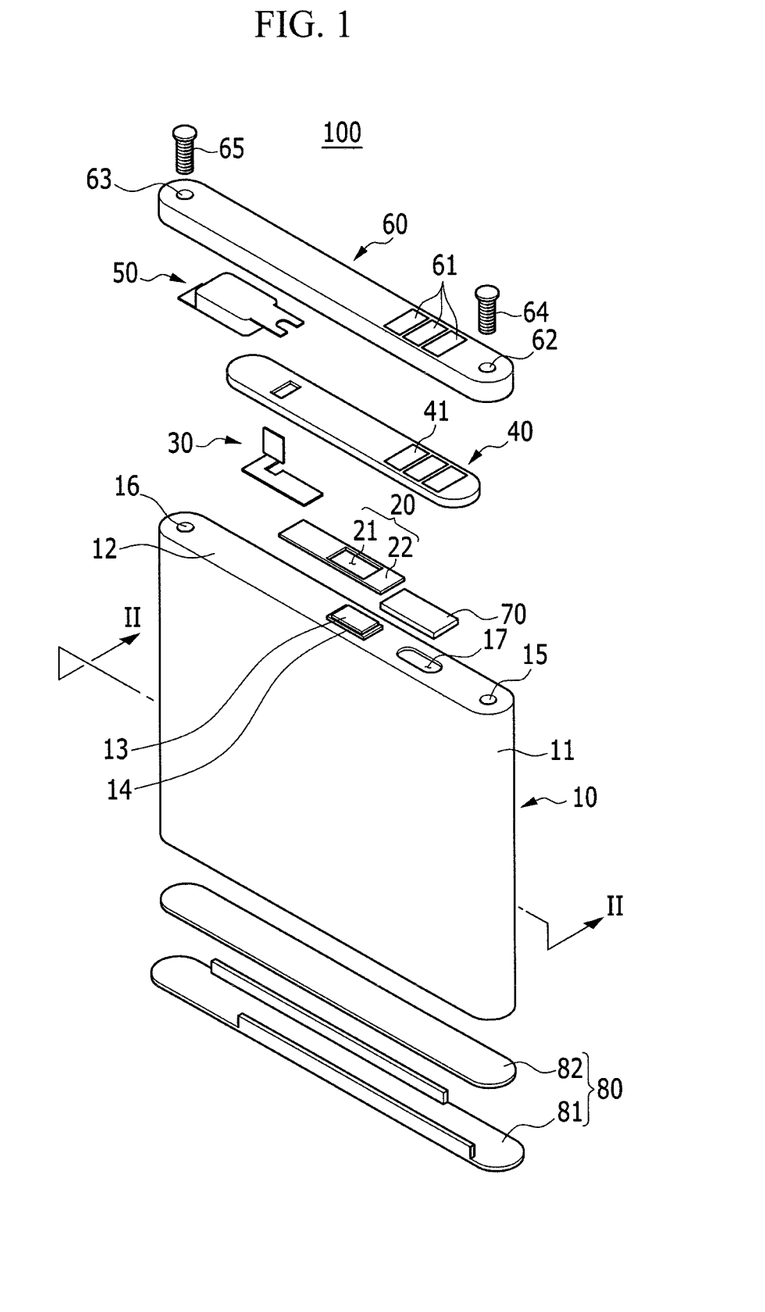
FIG. 1 illustrates an exploded perspective view of a rechargeable battery according to a first exemplary embodiment.
Figure 2:
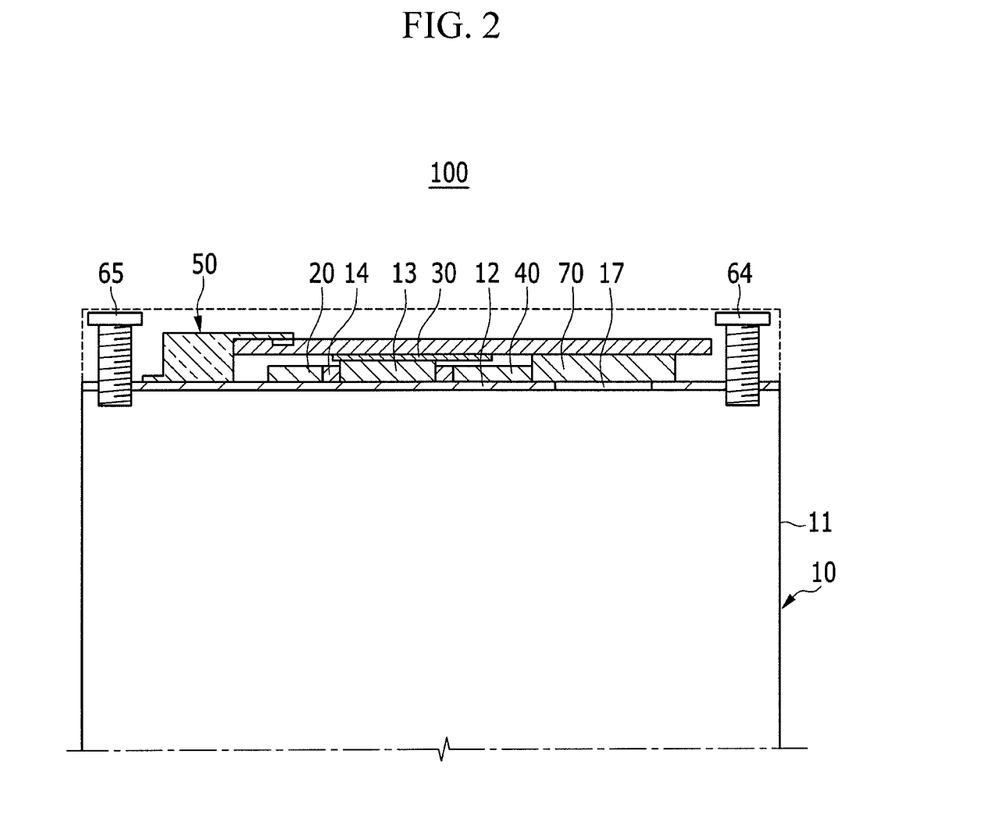
FIG. 2 illustrates a cross-sectional view of FIG. 1, taken along the line II-II.

FIG. 1 illustrates an exploded perspective view of a rechargeable battery according to a first exemplary embodiment, and FIG. 2 illustrates a cross-sectional view of FIG. 1, taken along the line II-II.

Referring to FIG. 1 and FIG. 2, a rechargeable battery 100 according to the present exemplary embodiment may include a protection circuit module (including, e.g., a bare cell 10, a first insulation member 20, a conductive connection member 30, a protection circuit board 40, and a protection element 50), an upper cover 60, a second insulation member 70, and a lower cover 80.

The bare cell 10 may include a case 11 (in which an electrode assembly is installed or accommodated), a cap plate 12 coupled with the case 11 (e.g., in an opening of the case 11), an electrode terminal 13 in the cap plate 12, a gasket 14 insulating the electrode terminal 13 and the cap plate 12, first and second coupling holes 15 and 16, and a gas outlet 17.

For example, the case 11 may be formed in an approximately rectangular parallelepiped shape, and an opening may be formed in one surface thereof. Thus, the case 11 may receive the electrode assembly (including a first electrode, a second electrode, and a separator). Here, the first electrode and the second electrode may respectively be one of a positive electrode and a negative electrode.

However, the exemplary embodiments are not limited thereto, and the case 11 may be formed in various shapes, e.g., a cylindrical shape, a pouch shape, or the like.

In an implementation, the cap plate 12 may be formed of an electric conductive plate, and may be coupled with the opening of the case 11 to seal the opening.

In an implementation, the cap plate 12 may have positive polarity or negative polarity by being electrically connected with one of the first electrode and the second electrode.

The electrode terminal 13 may be electrically connected with another of the first electrode or the second electrode. For example, if the cap plate 12 is electrically connected to the first electrode of the electrode assembly, the electrode terminal 13 may be electrically connected to the second electrode of the electrode assembly.

In addition, the gasket 14, which may be formed of an insulating material (e.g., rubber or resin), may be between the electrode terminal 13 and the cap plate 12 for electric insulation therebetween.

Hereinafter, for better comprehension and ease of description, it will be described that the electrode terminal 13 is electrically connected with the first electrode of the electrode assembly, and the case 11 and the cap plate 12 are electrically connected with the second electrode of the electrode assembly.

In addition, the first insulation member 20 may be coupled with the cap plate 12 by an adhesive (not illustrated) coated on a surface of the first insulation member 20 that faces the cap plate 12.

In this case, the electrode terminal 13 may be inserted into a terminal coupling hole 21 in the first insulation member 20. A main body 22 of the first insulation member 20 (where the terminal coupling hole 21 is not formed) may be coupled with the cap plate 12. Thus, the first insulation member 20 may be between the protection circuit board 40 and the cap plate 12 for electric insulation therebetween.

One end of the conductive connection member 30 may be coupled with the electrode terminal 13, and another end thereof may be coupled with the protection circuit board 40.

The electrode terminal 13 and the protection circuit board 40 may be electrically connected with each other through the conductive connection member 30. Thus, the protection circuit board 40 may be electrically connected with the first electrode through the electrode terminal 13.

In an implementation, one end of the protection element 50 may be coupled with the protection circuit board 40, and another end thereof may be coupled with the cap plate 12 by, e.g., welding.

The protection circuit board 40 may be electrically connected with the cap plate 12 through the protection element 50. Thus, the protection circuit board 40 may be electrically connected to the second electrode through the cap plate 12.

Accordingly, it is possible for a current path to be formed between the first electrode, the protection circuit board 40, the protection element 50, and the second electrode, if desired.

The protection element 50 may include at least one conducting wire (formed of a material that has electric conductivity and is melted at a temperature that exceeds a predetermined level) and an insulating resin that surrounds the wire.

Thus, if an overcurrent flows into the rechargeable battery 100 and the temperature of the protection element 50 exceeds a predetermined level, the protection element 50 may melt so that a current path between the bare cell 10 and the protection circuit module may be blocked or interrupted.

In addition, the second insulation member 70 may be between the protection circuit board 40 and the cap plate 12 so that the protection circuit board 40 and the cap plate 12 may be electrically insulated from each other.

The upper cover 60 may be formed through a hot melt process.

A terminal connection portion 61 and first and second coupling holes 62 and 63 (to which the terminal connection unit 61 and the first and second coupling members 64 and 65 are respectively coupled) may be formed in the upper cover 60.

Thus, the upper cover 60 may surround the protection circuit board 40 and the protection element 50 at an upper portion of the bare cell 10, and the first coupling member 64 and the second coupling member 65 may respectively be inserted into the first coupling hole 62 and the second coupling hole 63 so as to be inserted into the first coupling hole 15 and the second coupling hole 16 on the cap plate 12, respectively, in a fixed manner.

The lower cover 80 may include a lower cover main body 81 (including at least one protrusion) and a lower cover adhesive portion 82.

Figure 3:
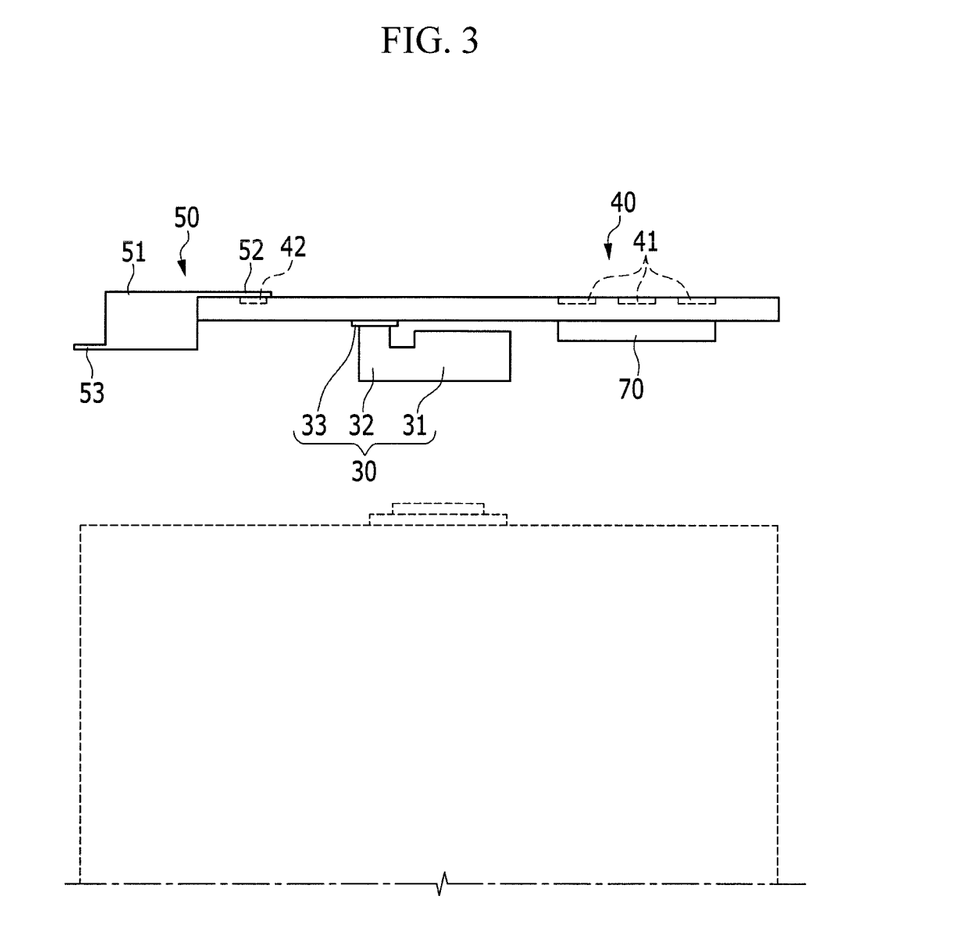
FIG. 3 illustrates a side view of a protection element and a protection circuit board of FIG. 1 in a coupled state.

FIG. 3 illustrates a side view of the protection element and the protective circuit board of FIG. 1 in a coupled state.

Referring to FIG. 3, the protection circuit board 40 may include a protection circuit (not illustrated), an outer terminal 41, and a protection element connection pattern 42. The outer terminal 41 may be connected to the protection circuit by, e.g., soldering.

In an implementation, the conductive connection member 30 may include an electrode terminal connection portion 31, a main body 32, and a protection circuit board coupling portion 33. The protection circuit board coupling portion 33 may be coupled with the protection circuit board 40.

Thus, the protection circuit board 40 may be electrically connected to the first electrode through the conductive connection member 30 and the electrode terminal 13.

In an implementation, the protection element 50 may include a protection element main body 51, a first protrusion 52 (hereinafter, referred to as a protection element protrusion) extending from one side of the protection element main body 51, and a second protrusion 53 (hereinafter, referred to as a fixing protrusion) extending from another side of the protection element main body 51. In an implementation, the protection element protrusion 52 may be offset from the fixing protrusion 53, e.g., the protection element protrusion 52 may be in a plane that is different from a plane of the fixing protrusion 53.

The protection element protrusion 52 may be electrically connected to the protection element connection pattern 42 of the protection circuit board 40.

For example, a groove in the protection element protrusion 52 and the protection element connection pattern 42 may be soldered so that the protection element protrusion 52 and the protection element connection pattern 42 may be coupled to each other.

In an implementation, the fixing protrusion 53 of the protection element 50 may be coupled with the cap plate 12 by, e.g., welding or the like.

Thus, the protection circuit board 40 may be electrically connected with the second electrode through the protection element 50.

For example, the protection circuit board 40 and the second electrode may be electrically connected only by the protection element 50 without using another structure (e.g., a lead tab) so that a number of parts forming the rechargeable battery 100 may be reduced, thereby advantageously reducing production cost of the rechargeable battery 100.

In an implementation, the protection element 50 may be coupled with the cap plate 12 by, e.g., welding, so that the protection circuit board 40 may be stably fixed to the cap plate 12 by the protection element 50.

Figure 4:
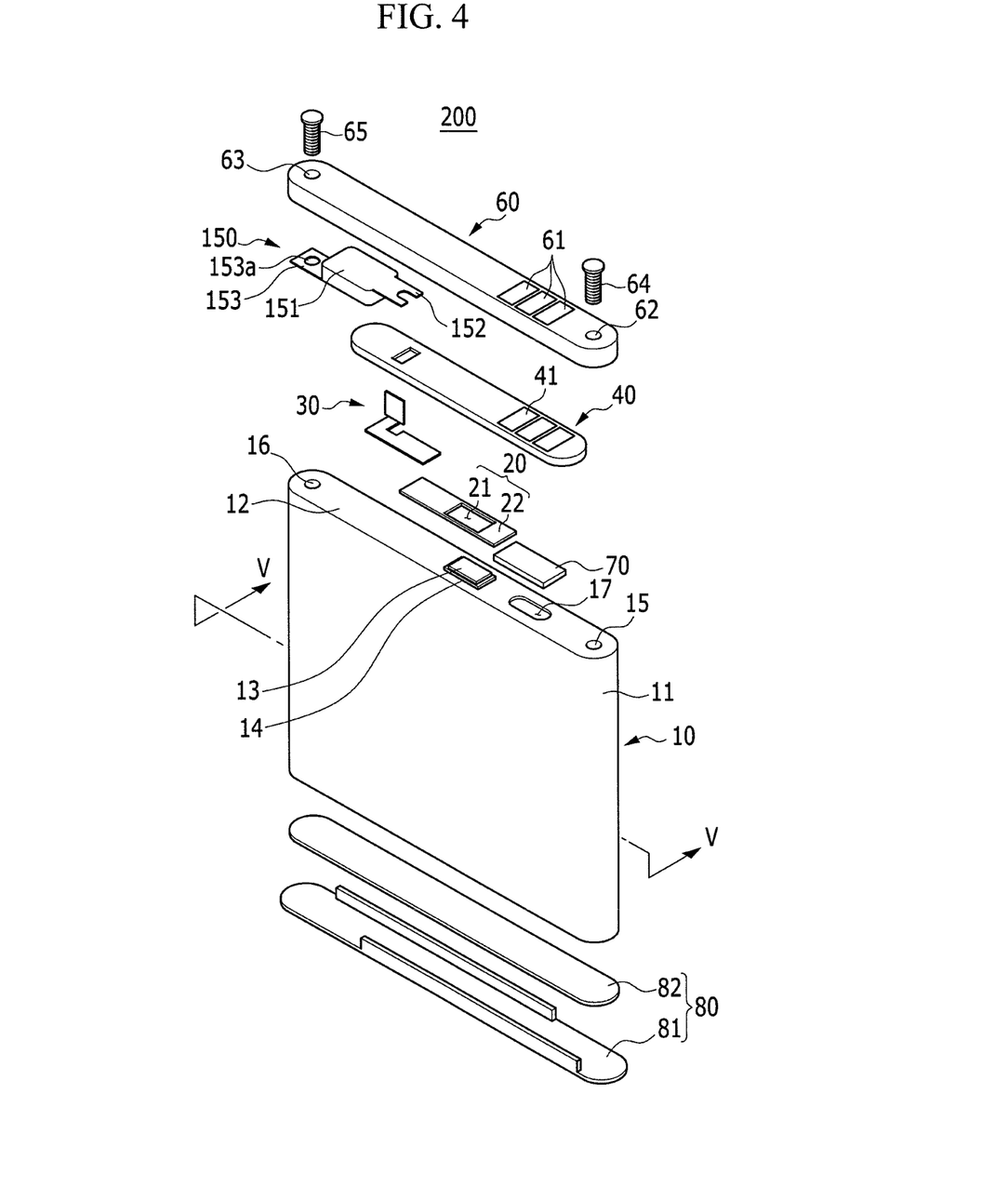
FIG. 4 illustrates an exploded perspective view of a rechargeable battery according to a second exemplary embodiment.
Figure 5:
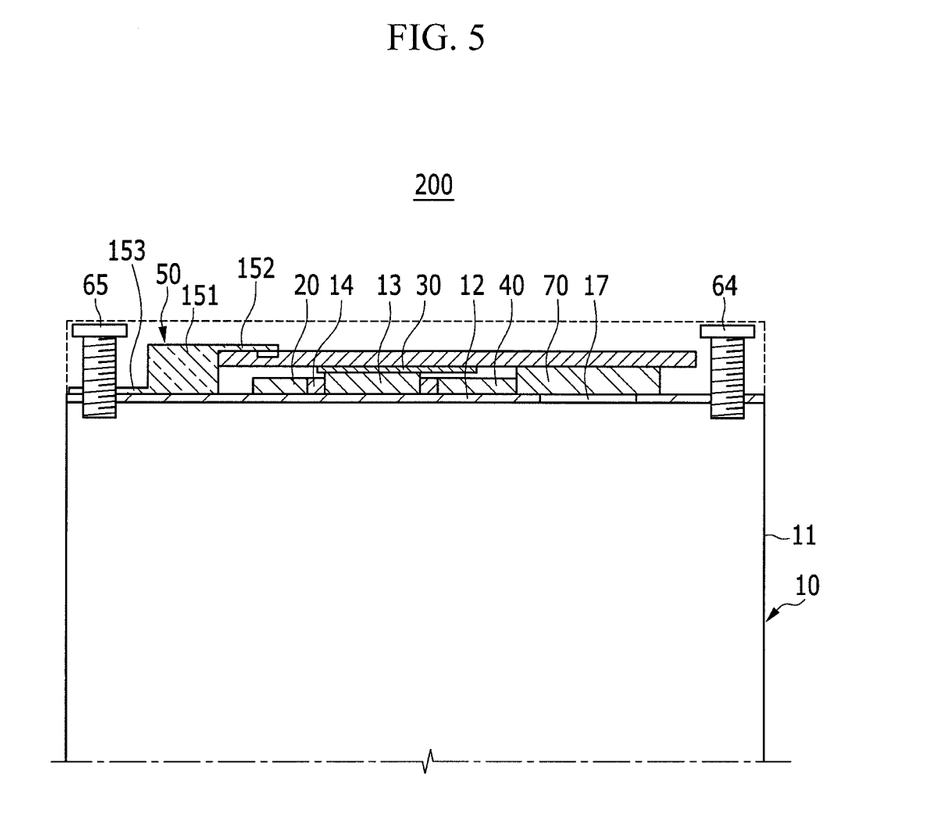
FIG. 5 illustrates a cross-sectional view of FIG. 4, taken along the line V-V.

FIG. 4 illustrates an exploded perspective view of a rechargeable battery according to a second exemplary embodiment, and FIG. 5 illustrates a cross-sectional view of FIG. 4, taken along the line V-V.

Referring to FIG. 4 and FIG. 5, a rechargeable battery according to the present exemplary embodiment may have the same structure of the rechargeable battery 100 according to the previous embodiment, except for the structure of a protection element 150. Accordingly, a repeated description of the equivalent structure of the rechargeable battery 100 according to the previous embodiment may be omitted.

Referring to FIG. 4 and FIG. 5, the protection element 150 according to the present exemplary embodiment may include a protection element main body 151, a first protrusion 152 (hereinafter, referred to as a protection element protrusion) extending from one side of the protection element main body 151, and a second protrusion 153 (hereinafter, referred to as a fixing protrusion) extending from another side of the protection element main body 151 and having a through-hole 153a therein.

The protection element protrusion 152 may be coupled with the protection element connection pattern 42 of the protection circuit board 40 by, e.g., soldering between a groove formed in the protection element protrusion 152 and the protection element connection pattern 42.

The fixing protrusion 153 of the protection element 150 may be fixed to the cap plate 12 by the second coupling member 65.

For example, the fixing protrusion 153 of the protection element 150 may be fixed to the cap plate 12 by disposing the fixing protrusion 153 of the protection element 150 on the cap plate 12, i.e., overlying the second coupling hole 16, and then fixing the second coupling member 65 to the cap plate 12 by inserting the second coupling member 65 into the second coupling hole 63 in the upper cover 60, the through-hole 153a of the fixing protrusion 153, and the second coupling hole 16 in the cap plate 12.

Accordingly, the cap plate 12 may be electrically connected with the second electrode. Thus, the protection circuit board 40 and the second electrode may be electrically connected only by the protection element 150, without using another structure (e.g., a lead tab) so that a number of parts forming the rechargeable battery 200 may be reduced, thereby advantageously reducing production costs of the rechargeable battery 200.

Further, the protection element 150 may be fixed to the cap plate 12 by the coupling member 65, so that the protection circuit board 40 may be stably fixed to the cap plate 12 by the protection element 150.

Figure 6:
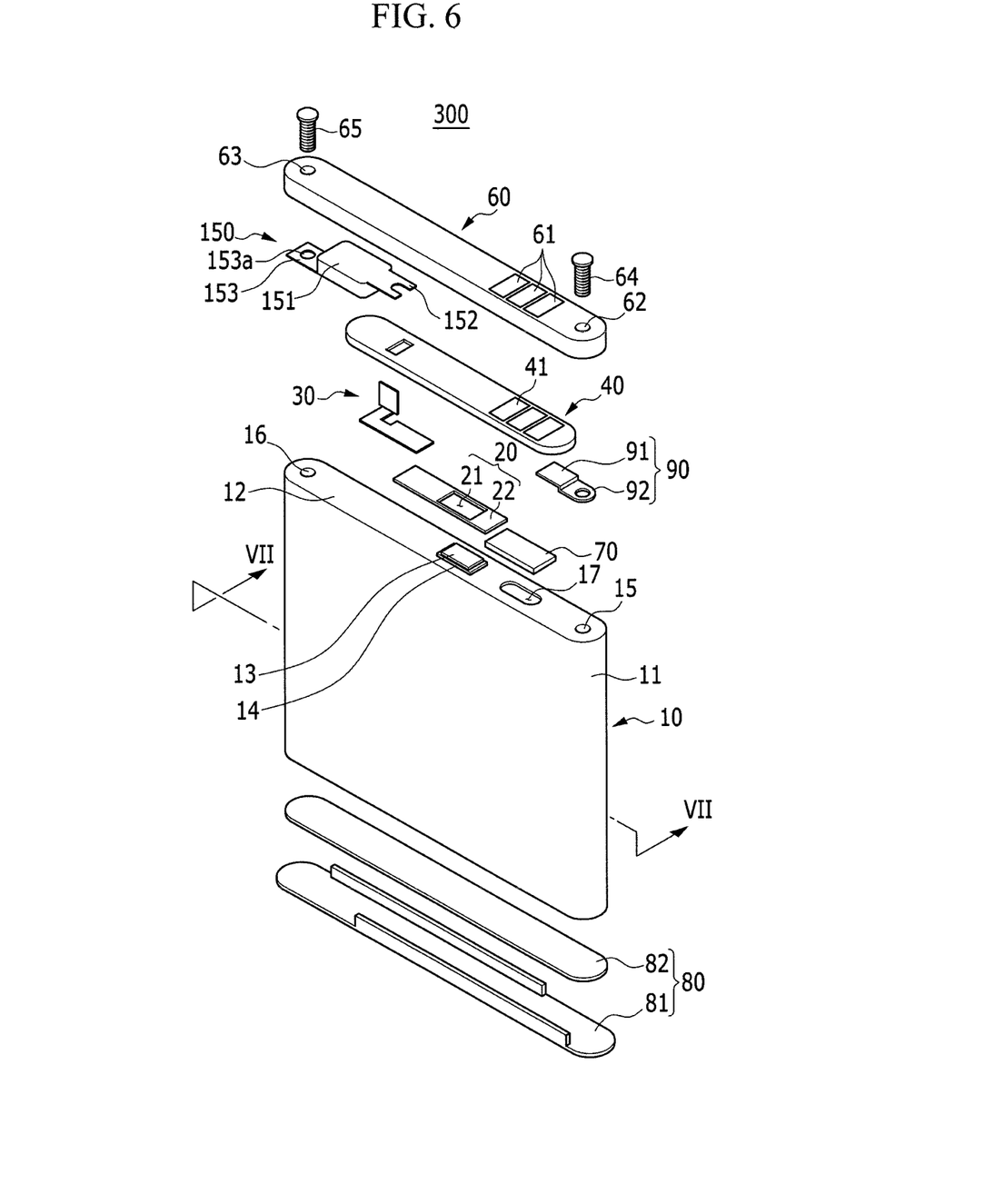
FIG. 6 illustrates an exploded perspective view of a rechargeable battery according to a third exemplary embodiment.
Figure 7:
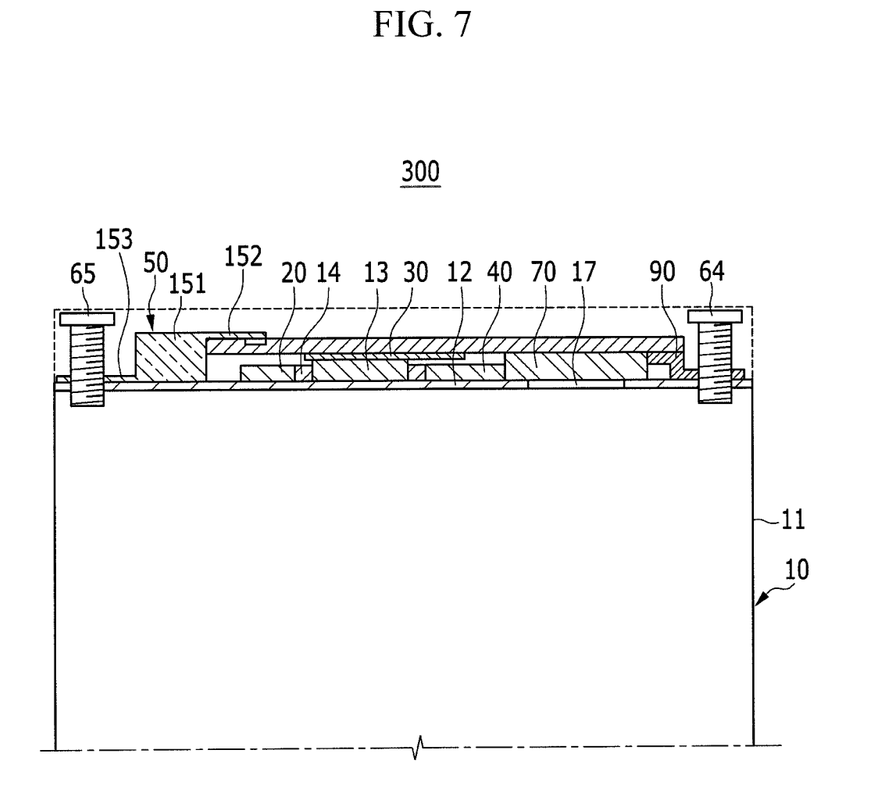
FIG. 7 illustrates a cross-sectional view of FIG. 6, taken along the line VII-VII.

FIG. 6 illustrates an exploded perspective view of a rechargeable battery according to a third exemplary embodiment, and FIG. 7 illustrates a cross-sectional view of FIG. 6, taken along the line VII-VII.

Referring to FIG. 6 and FIG. 7, a rechargeable battery 300 according to the present exemplary embodiment may have the same structure of the rechargeable battery 200 according to the second exemplary embodiment, except for the structure of a support member 90.

Therefore, a repeated description of the equivalent structure of the rechargeable battery 200 according to the second exemplary embodiment may be omitted.

Referring to FIG. 7, the support member 90 according to the present exemplary embodiment may include a support member main body 91 and a support member protrusion 92 extending from the support member main body 91 and having a through-hole formed therein.

The support member 90 may be between the protection circuit board 40 and the cap plate 12 so that the support member 90 may support the protection circuit board 40.

For example, the support member main body 91 may be coupled with a surface of the protection circuit board 40 that faces the cap plate 12, and the support member protrusion 92 may be fixed to the cap plate 12 by the first coupling member 64.

For example, when the first coupling member 64 is inserted into the first coupling hole 62 of the upper cover 60, the through-hole of the support member protrusion 92, and the first coupling hole 15 of the cap plate 12 and thus being fixed to the cap plate 12, the support member protrusion 92 may be fixed to the cap plate 12.

In an implementation, the support member main body 91 may be coupled with the protection circuit board 40 by, e.g., welding or the like. In an implementation, the support member 90 may be formed of an insulation material. In an implementation, the support member 90 may have an offset or stepped structure, e.g., a plane of the support member main body 91 may be in a plane different from a plane of the support member protrusion 92.

Thus, according to the present exemplary embodiment, the protection circuit board 40 may be stably fixed to the cap plate 12 by the support member 90.

By way of summation and review, an operation voltage of a rechargeable battery may be about 3.6V, and an over-charge or over-discharge may occur during repeated charging and discharging. The over-charge or the over-discharge may generate gas or heat (due to decomposition of an electrolyte solution of the rechargeable battery) so that performance of the rechargeable battery may be deteriorated or the rechargeable battery may be damaged.

Accordingly, a protection circuit module may be used to help reduce and/or prevent the over-charge or the over-discharge from occurring in the rechargeable battery. In this case, an additional structure may electrically connect a protection element and a protection circuit board to a negative electrode and a positive electrode of the rechargeable battery.

The embodiments provide a rechargeable battery including an improved protection element.

The embodiments provide a rechargeable battery including a protection element that can be directly connected to an electrode of the rechargeable battery.

The embodiments provide a rechargeable battery including a structure in which the protection circuit board can be stably fixed to the rechargeable battery.

According to an embodiment, the rechargeable battery of which the protection circuit board and the electrodes are electrically connected with each other through the protection element may be provided.

Further, according to another embodiment, the rechargeable battery of which the protection circuit board can be stably fixed may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   a case in which an electrode assembly is accommodated;
   a cap plate coupled with the case;
   a protection circuit board coupled with the cap plate, the protection circuit board being electrically connected with a first electrode of the electrode assembly; and
   a protection element coupled with the cap plate, the protection element electrically coupling a second electrode of the electrode assembly with the protection circuit board,
   wherein:
   the cap plate is electrically connected with the second electrode of the electrode assembly, and
   the protection element is electrically connected with the cap plate and with the second electrode of the electrode assembly through the cap plate.

2. The rechargeable battery as claimed in claim 1, wherein the protection element includes:
   a first protrusion coupled with the protection circuit board, and
   a second protrusion coupled with the cap plate.

3. The rechargeable battery as claimed in claim 2, wherein the second protrusion is coupled with the cap plate by welding.

4. The rechargeable battery as claimed in claim 2, wherein the protection element is coupled with the cap plate by a coupling member inserted into a through-hole in the second protrusion of the protection element.

5. The rechargeable battery as claimed in claim 2, wherein the first protrusion is on a plane different from a plane of the second protrusion.

6. The rechargeable battery as claimed in claim 1, further comprising a support member between the protection circuit board and the cap plate.

7. The rechargeable battery as claimed in claim 6, wherein the support member includes:
   a support member main body coupled with the protection circuit board, and
   a support member coupling portion coupled with the cap plate.

8. The rechargeable battery as claimed in claim 7, wherein the support member is fixed to the cap plate by a coupling member inserted into a through-hole of the support member protrusion of the support member.

9. The rechargeable battery as claimed in claim 6, wherein the support member is formed of an insulation material.

10. The rechargeable battery as claimed in claim 6, wherein the support member has a stepped structure.

* * * * *